United States Patent [19]

Jarret et al.

[11] 3,740,630
[45] June 19, 1973

[54] VARIABLE-RELUCTANCE ELECTRIC MOTOR

[76] Inventors: Jean Jarret, La Champanelle, Chemin du Clos Baron, Fourqueux; Jacques Jarret, 35, avenue du Belloy, Le Vesinet, both of France

[22] Filed: Feb. 28, 1972

[21] Appl. No.: 229,805

[52] U.S. Cl. ............... 318/138, 310/163, 310/198, 318/254
[51] Int. Cl. .......................................... H02k 23/42
[58] Field of Search.......................... 318/138, 254; 310/162, 163, 198, 257

[56] References Cited
UNITED STATES PATENTS

| | | |
|---|---|---|
| 2,105,513 | 1/1938 | Welch .................................. 310/163 |
| 2,249,029 | 7/1941 | Müllerheim ...................... 310/163 X |
| 2,295,286 | 9/1942 | Michelsen ........................... 310/163 |
| 2,589,999 | 3/1952 | Feiertag et al. ................. 310/162 X |
| 3,517,289 | 6/1970 | Brunner et al. ................. 318/254 X |

Primary Examiner—J. D. Miller
Assistant Examiner—H. Huberfeld
Attorney—Abraham A. Saffitz

[57] ABSTRACT

Variable reluctance electric motor. Said motor comprises a rotor having uniformly distributed teeth, an annular stator having magnetic studs grouped in equal length sectors but shifted by a quarter of a stud pitch from a sector to the following, and a set of peripheral fixed windings each surrounding all the studs of a sector and supplied by signals from a timing generator controlled by a direct current source and by the movement of the rotor so that the half of said windings are energized at any time and are switched for each rotation of the rotor of a quarter of a stud pitch.

Said motor may operate at a low speed.

3 Claims, 8 Drawing Figures

VARIABLE-RELUCTANCE ELECTRIC MOTOR

This invention relates to a variable-reluctance electric motor supplied by a direct current source, able to operate with a low speed and mainly comprising a rotor having teeth of uniform pitch, an annular stator in which magnetic studs or teeth or the like have windings being selectively and temporarily energised by a DC supply, by means of switching devices of said stator windings under the control of a control device synchronized onto the instantaneous angular position of the rotor, the whole being such that the back-electromotive force and the delivered torque are constant for a given current.

The conventional construction for such machines is to embody the stator in the form of two rings of studs or teeth or the like which are symmetrical of a centre-plane perpendicular to the machine shaft, each ring comprising four studs or the like per tooth. With this system, the maximum number of teeth possible is 10 or 12 and a large number of windings, as a rule, at least four windings per tooth, must be provided. If N denotes the mean motor speed in rpm and $n$ denotes the number of rotor teeth, the usually electronic commutating facility provided must operate at a commutation frequency of 4Nn.

A slow-running motor is of use e.g., for driving a land vehicle by direction drive of the driving wheels without any stepdown or for a surface or underwater vessel whose screws must be driven fairly slowly if performance is to be satisfactory. The only way of optimising the possibilities of the electronic switching facility in a slow-running motor of this kind is to increase the number of rotor teeth, in which event there is an appreciable increase in constructional complexity and in the copper weight of the windings.

It is an object of this invention to obviate these disadvantages by providing a novel machine construction in which the number of rotor teeth can be increased without any proportional increase in the number of windings, as a result of an appropriate regrouping of the studs or patches or the like in the windings.

Accordingly, this invention provides a machine of the kind hereinbefore specified wherein the stator has a number 4m of identical sectors which is a multiple of four and which is equal to or greater than eight, each sector comprising magnetic studs or patches or the like uniformly distributed at the same pitch as the rotor teeth and a single winding covering all the studs or the like of the sector, any two consecutive sectors being spaced apart from one another by an interval such that between any two consecutive sectors the rotor teeth are set back by a quarter pitch or a multiple ($n$) thereof with respect to the direction of the rotation of the rotor. Clearly, therefore, the number of rotor teeth is the same as the total number of sector studs plus $n \times 25$ percent of the number of sectors, whereas the number of windings becomes the same as the number of sectors, so that the intended result is achieved. The reason for choosing at least eight sectors is to ensure that the rotor is in proper mechanical balance. The reason for the offset of 25 percent of the rotor pitch or a multiple thereof between consecutive sectors is of course, as will become more clearly apparent from the description, to ensure that the elementary back-electromotive forces and the mechanical forces are complementary.

Advantageously:

the peripheral length of each stud or patch or the like is less than the peripheral length of each rotor tooth, and the peripheral length of each between-studs projection is greater than the peripheral length of each such tooth. This feature ensures that sufficient dead times (times of zero induced voltage in the inside winding) are available for commutation;

each tooth is in known manner embodied by ferromagnetic lamellae embedded in a non-magnetic substance, and the density of ferromagnetic substance over the peripheral length of each tooth is variable, being relatively high near the tooth axis and being lower in the two end parts around the relatively high-density axial part, for the magnetic flux in each stud then varies in time in accordance with a law enabling the elementary back-electromotive forces to be complementary.

The invention will be more clearly understood from the following description of an embodiment, reference being made to the accompanying drawings wherein.

Figure 1:
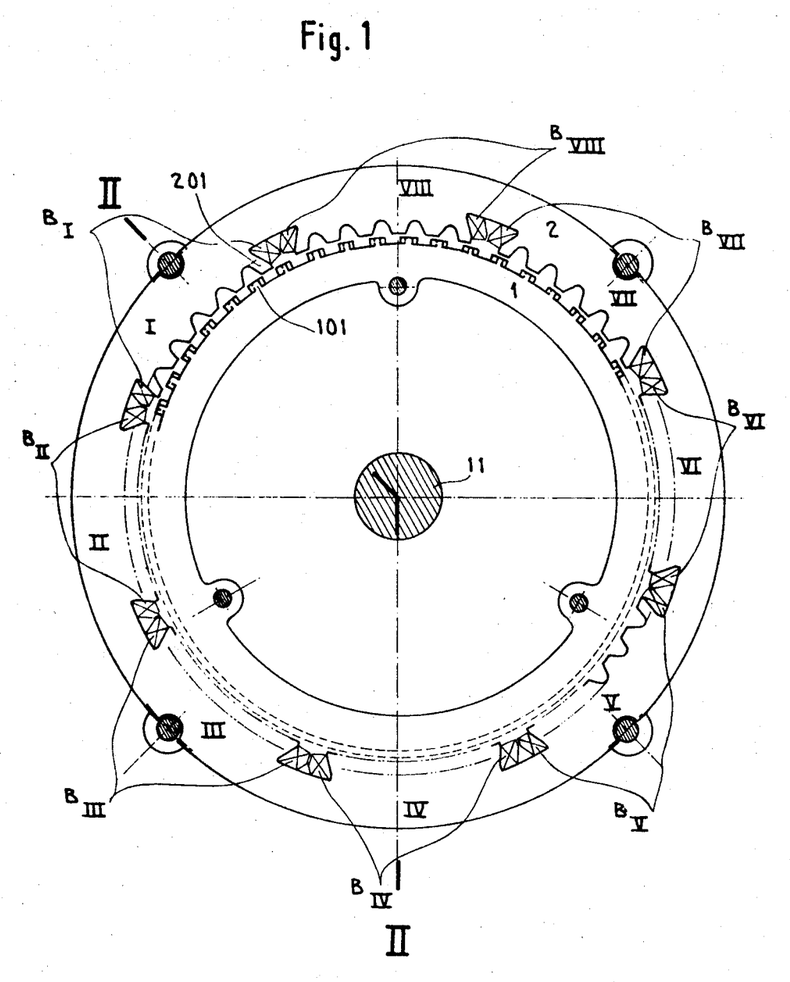
FIG. 1 is a view in cross-section on the line I—I of FIG. 2 of a motor according to the invention.
Figure 2:
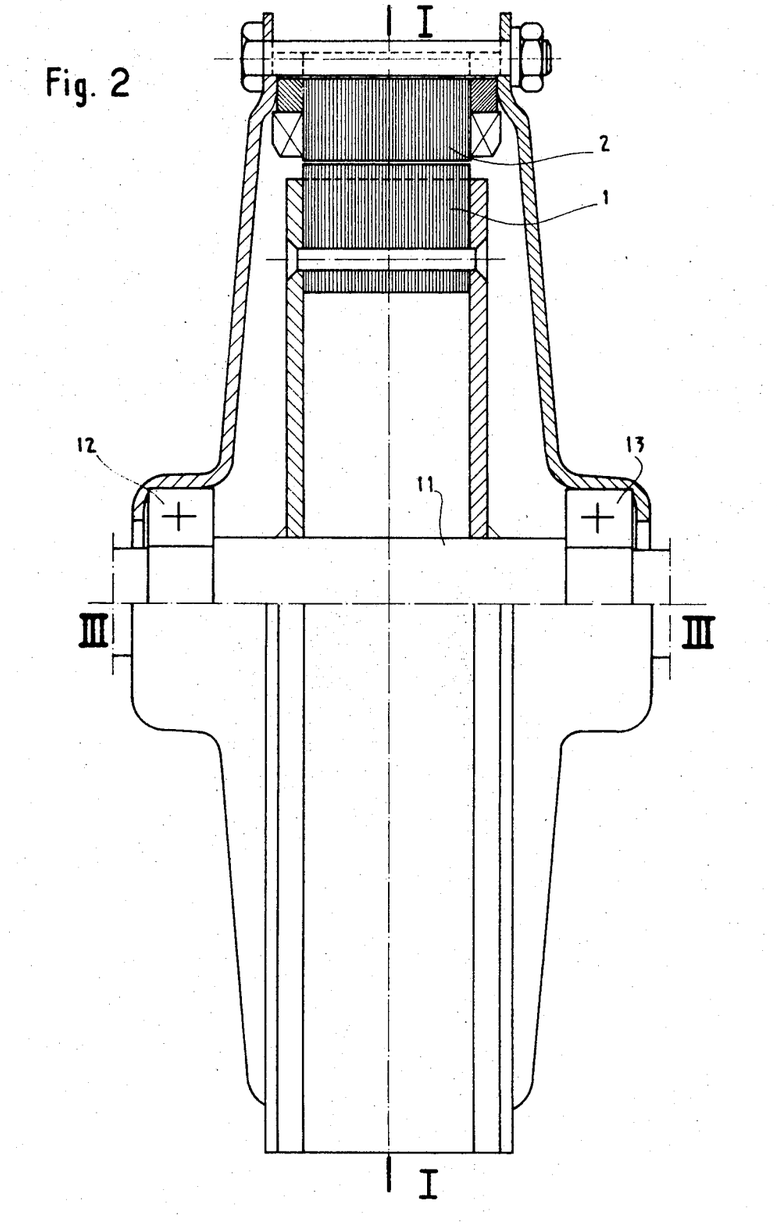
FIG. 2 is a view in radial section of the same motor on the line II—II of FIG. 1.

As shown in FIGS. 1 and 2, a variable-reluctance motor according to the invention has an axis I—I of symmetry of revolution and, perpendicular to such axis, a plane of symmetry III—III. The motor comprises a rotor 1 rigidly secured to a shaft 11 running in rolling bearings 12, 13 and a stator 2. Rotor 1 is embodied by a ring of laminations of non-saturable silicon iron having a high density of iron, said laminations having the same shape.

Teeth, as 101, which are in general shape oblong, extend from the cylindrical peripheral surface of the rotor ring into the stator-rotor air gap. In the example shown it is assumed that there are 50 teeth; they are disposed at a constant pitch of twice the peripheral length of one tooth; their density varies in that they have a short central portion with a relatively high iron density, e.g., 84 percent, symmetrically framed by two much lower density end parts, e.g., of 42 percent; it is a very simple matter to devise this 2 : 1 ratio between the densities by means of overlapping in the central part of the sheets used for the two end portions; these laminations for instance may be identical and have the shape of a toothed wheel having a uniform pitch, the peripheral length of said laminations teeth being lower than the peripheral length of stator studs, which is in turn lower than the peripheral length of rotor teeth. These laminations may be stacked with angular shifting with each other alternatively in a determined direction and in the opposite direction, said shifting for instance being equal to 2°. Of course, because of this lower density of the teeth the same become saturated when the magnetic field produced in the air gap is strong enough.

Stator 2 is also embodied by a ring of laminations of non-saturable silicon iron having a high iron density.

Rectangular-based studs or patches or the like, as 201, extend from the cylindrical underside of the ring into the stator-rotor air gap. The members 201 are so distributed that the machine can operate on the known basis hereinbefore set forth. Accordingly, the stator of the example of FIGS. 1 and 2 has eight identical sectors I - VIII each having six studs at the same pitch as the rotor teeth; however, any two consecutive sectors are separated from one another by a gap such that from one to the other the rotor teeth are set back by 25 percent of a pitch with respect to the direction of rotation of the rotor; consequently, in the example shown there are only $$8 \times 6 = 48 \text{ studs } 201 \text{ for } 50 \text{ teeth;}$$

also, each sector comprises a single winding which covers all the six studs of the particular sector concerned. Of course, the cross-section of each winding is sufficient to achieve the required number of ampere-turns for producing an appropriate magnetic field between the stud undersides and the cylindrical part of the rotor.

Figure 3:
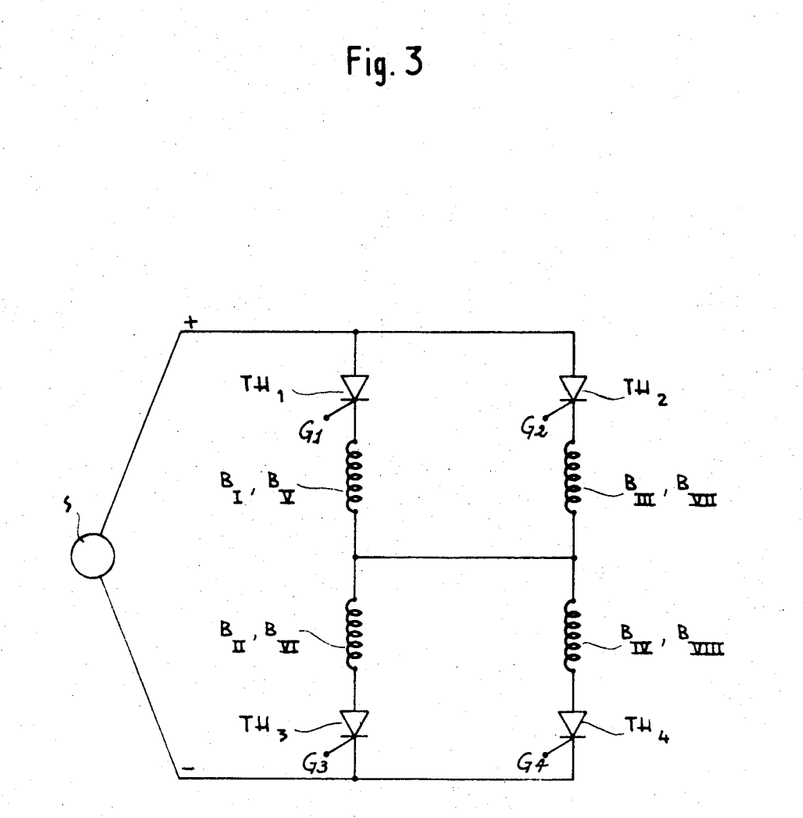
FIG. 3 is a basic diagram of the electronic commutating or switching facility for the stator windings.

The windings $B_I$ to $B_{VIII}$ are energized by a DC source S and switched or commutated, as will be seen hereinafter, e.g., by means of thyristors $TH_1$ to $TH_4$, in a circuit arrangement whose underlying idea is shown in FIG. 3. The control grids $G_1$ to $G_4$ of said thyristors are connected to a squared signals generator of known type supplied by source S and synchronized onto said rotor.

Figure 4:
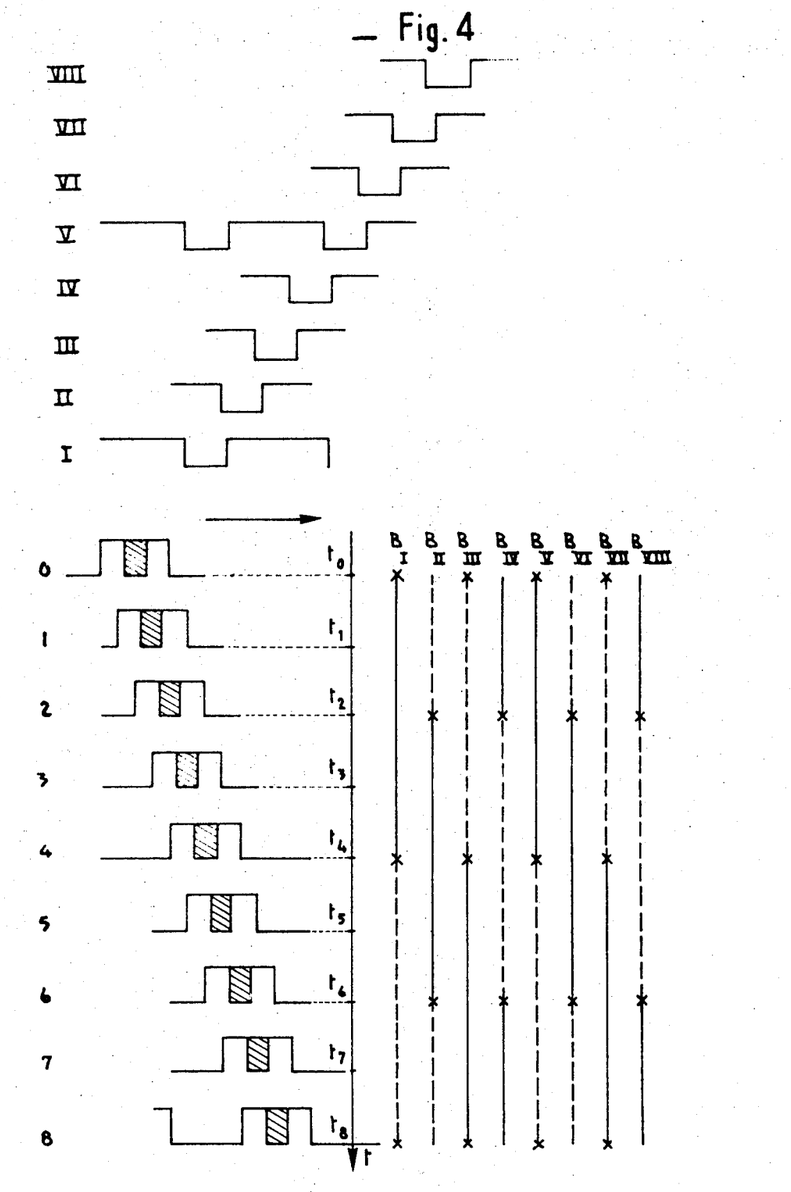
FIG. 4 is a diagrammatic diagram of the stator studs or patches or the like, of a rotor tooth at various times in a period, and of the programme of current flows through the stator windings.

Current distribution between the windings is shown in FIG. 4. The top left-hand side of FIG. 4 shows how the studs of the various stator sectors I – VIII are offset from one another (by 25 percent of rotor pitch). The bottom left-hand part of FIG. 4 shows a rotor tooth considered during its advance of a pitch from the time $t_0$ to time $t_8$, which are equidistant times in an interval corresponding to a movement of a pitch of the stator; the peripheral length of the tooth, as mentioned above, is between the peripheral length of a stator stud and the peripheral length of the normal gap or interval between two studs. The bottom right-hand part of FIG. 4 shows a graph on the same time scale and showing for the same period the conductive intervals (solid line), the non-conductive intervals (broken line) of the windings $B_I$ to $B_{VIII}$, and the commutation or switching times, which are actually brief breaks and are denoted by crosses.

As will be clearly apparent, for instance, at the time $t_3$ the current flows through the windings $B_I$, $B_{II}$, $B_V$, $B_{VI}$ at a time when the least dense portion of the teeth is entering the air gaps of the corresonding sectors and leaving the air gaps of the sectors III, IV, VII and VIII; also, at the time $t_4$ current continues to flow through the windings $B_{II}$, $B_{VI}$ but is gradually being cut off in the windings $B_I$, $B_V$, at a time when the high density portion of the teeth is entering the air gaps of segments II, VI and leaving the air gaps of the sectors I, V.

What has just been stated with respect to the times $t_3$, $t_4$ can be repeated for the following times of the period considered, of course with a circular permutation of the indices.

Figure 5:
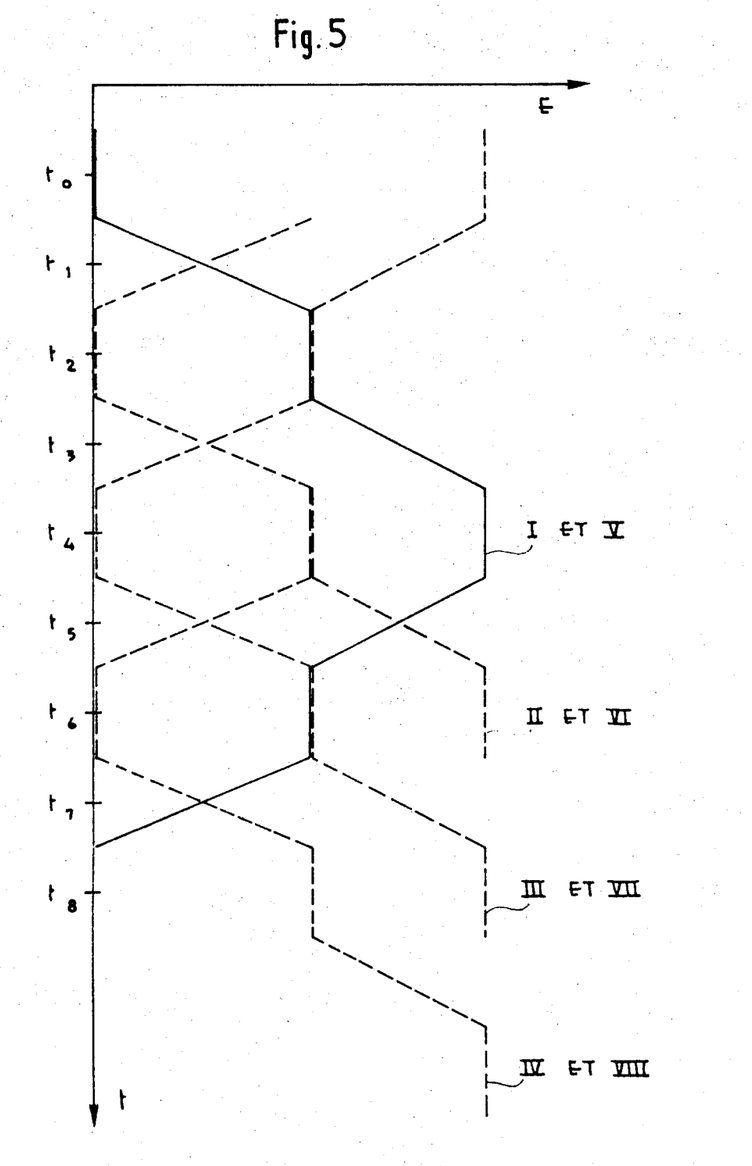
FIG. 5 is a diagram showing variations of the elementary back-electromotive forces (emf's) in the various windings.

The back-emf's produced in the various windings vary as shown in FIG. 5.

Figure 6:
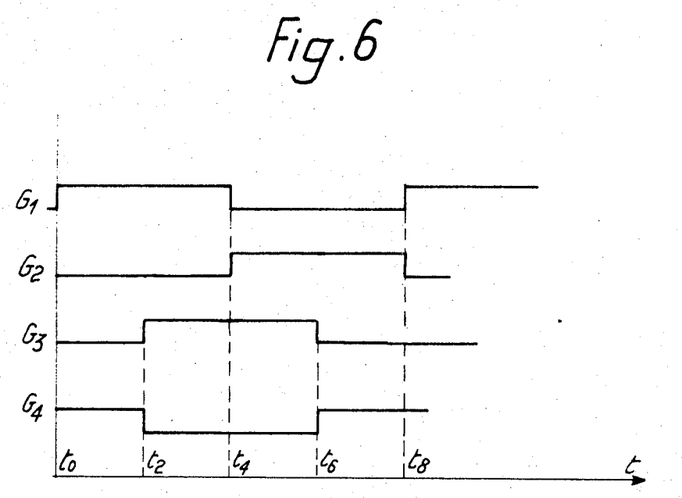
FIG. 6 is a diagram representing signals $G_1$ to $G_4$ applied to corresponding control electrodes of said switching devices of the stator windings.

FIG. 6 shows signals $G_1$ to $G_4$ applied to the four control electrodes $G_1$ to $G_4$ of the thyristors which cause the flowing of currents in the eight stator windings of FIG. 4.

Figure 7:
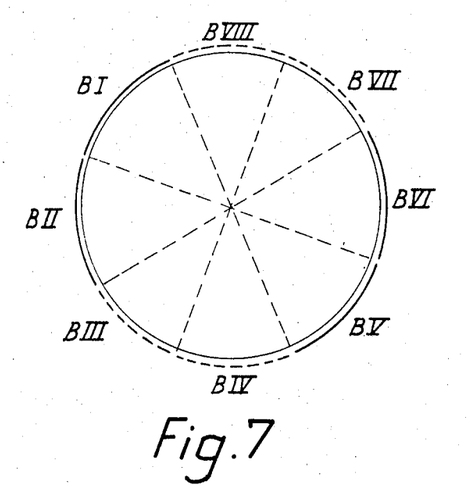
FIG. 7 shows the geometric positions of energized stator windings at a determined time in the case of a eight stator windings motor.

FIG. 7 shows a geometric diagram of energized windings energized at time $t_3$. These windings are referenced $B_I$, $B_{II}$, $B_V$ and $B_{VI}$. At the time $t_5$, after a rotation of the rotor of a quarter of a pitch, the energized windings are $B_{II}$, $B_{III}$, $B_{VI}$ and $B_{VII}$ windings and it is clear that the energized windings have been shifted by a eighth of a circumference, which is equal to the length of a sector, in the direction of rotation of the rotor.

Figure 8:
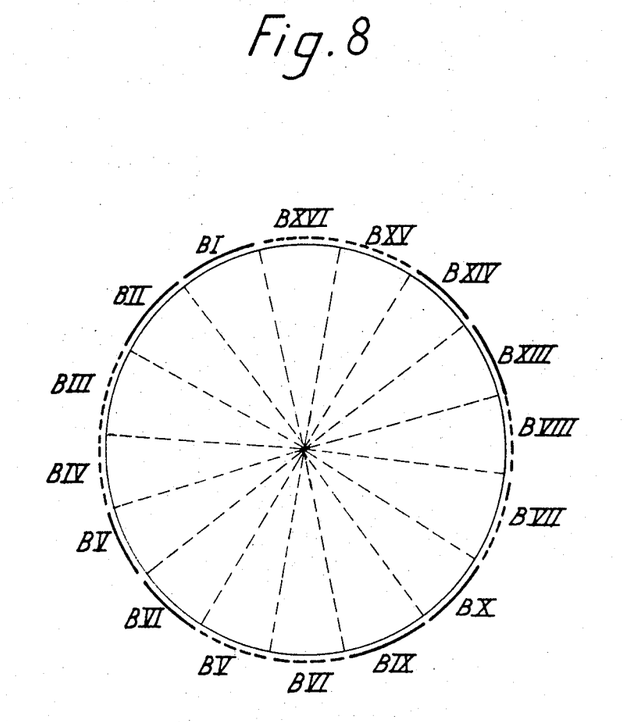
FIG. 8 shows a diagram analogous to that of FIG. 7 for a motor having 16 stator windings.

FIG. 8 shows a geometric diagram of energized windings at a determined time, in the case where it is provided 16 windings and 16 sectors, the shifting of stator studs from a sector to the following being also equal to a quarter of a pitch of the rotor teeth. Said energized windings are $B_I$, $B_{II}$, $B_V$, $B_{VI}$, $B_{IX}$, $B_X$, $B_{XIII}$, $B_{XIV}$, windings. After a movement of the rotor of a quarter of a pitch, the new energized windings are shifted of the length of a sector, that is to say 22°5, with respect to the previous energized windings. In said case, the studs pitch is further equal to the rotor teeth pitch, but the difference between the entire number of rotor teeth and the entire number of studs stator is equal to four. For instance, it may be provided 96 studs and 100 teeth, the number of studs associated to a winding being again equal to six.

In said motor with sixteen windings, the depth of magnetic circuit may be lower than the corresponding depth of a eight windings motor and the positionning of said windings in corresponding sectors is easier than in a eight windings motor.

To the extent that appropriate commutation establishes the current flow and maintains the same constant in the windings around the sectors whose air gaps the teeth are entering, the sum of the tangential forces of the magnetomechanical forces applied to the rotor, and the resulting torque, are constant. Torque is therefore substantially proportional to current at any rotor speed unless the stator studs and the cylindrical part of the rotor are saturated.

A machine of this kind is a variable-speed motor which has a very high torque-to-weight ratio and more particularly a very high torque in relation to the copper weight of the windings. For instance, a 14kg motor can provide a starting torque of 45 metres-newtons with a power dissipation not exeeding 700 watts.

Of course, a relatively powerful motor can, conveniently, have an exciting winding as well which is disposed in the stator coaxially of the shaft.

What we claim is:

1. Variable reluctance electrical motor comprising a rotor having uniformly distributed teeth, an annular stator having magnetic teeth grouped in 4m equal length sectors, m being an integer at least equal to 2, each sector having an equal number of uniformly distributed teeth the pitch of which is equal to the rotor teeth pitch, said sector teeth being shifted by a quarter of a pitch or a multiple thereof from a sector to the contiguous sector and a set of peripheral fixed windings the number of which is equal to the number of sectors, each surrounding all the teeth of a sector, said rotor being characterized in that said windings are supplied by a direct current source with currents having an invariable direction through switching devices controlled by signals generated by a timing generator synchronized onto the movement of the rotor so that the half of the windings are energized at any time and the energizing windings are switched for each rotation of a quarter of pitch of the periphery of the rotor or a multiple thereof, the new energized windings being shifted of a sector with respect to the previous energized windings.

2. Variable reluctance electrical motor as set foth in claim 1, wherein the energized windings at any time comprises two set of pairs of consecutive windings, the windings of the second set being diametrically opposite to the windings of the first set.

3. Variable reluctance electrical motor as set forth in claim 1, wherein the rotor comprises a stack of identical laminations of non-saturable iron each having teeth regularly distributed at its periphery and angularly shifted from each other in a direction or in the opposite direction so that the magnetic density is higher at the rotor teeth center than at the rotor teeth edges, the length of each said laminations tooth being less than the length of each rotor tooth.

* * * * *